US009614677B2

(12) United States Patent
Kennedy et al.

(10) Patent No.: US 9,614,677 B2
(45) Date of Patent: Apr. 4, 2017

(54) SECURE FUNCTION EVALUATION OF TREE CIRCUITS

(71) Applicant: Alcatel-Lucent USA Inc., Murray Hill, NJ (US)

(72) Inventors: William S. Kennedy, Chelsea (CA); Gordon T. Wilfong, Florham Park, NJ (US); Vladimir Kolesnikov, Jersey City, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 112 days.

(21) Appl. No.: 14/591,618

(22) Filed: Jan. 7, 2015

(65) Prior Publication Data

US 2016/0196436 A1 Jul. 7, 2016

(51) Int. Cl.
*H04L 9/32* (2006.01)
*G06F 21/60* (2013.01)
*H03K 19/20* (2006.01)

(52) U.S. Cl.
CPC .......... *H04L 9/3221* (2013.01); *G06F 21/602* (2013.01); *H03K 19/20* (2013.01); *H04L 2209/12* (2013.01); *H04L 2209/46* (2013.01)

(58) Field of Classification Search
CPC . G06F 21/602; H04L 9/3221; H04L 2209/12; H04L 2209/46; H03K 19/20
See application file for complete search history.

(56) References Cited

U.S. PATENT DOCUMENTS

| 6,834,272 | B1 | 12/2004 | Naor et al. |
| 8,443,205 | B2 | 5/2013 | Kolesnikov et al. |
| 2005/0201555 | A1* | 9/2005 | Yen ........................ H04L 9/3218 380/30 |
| 2009/0140767 | A1* | 6/2009 | Kolesnikov ........ H03K 19/1737 326/38 |
| 2012/0070000 | A1* | 3/2012 | Baechler ............... H04L 9/3218 380/255 |

(Continued)

OTHER PUBLICATIONS

Kruger, et al. "Secure function evaluation with ordered binary decision diagrams", CCS '06 Proceedings of the 13th ACM conference on Computer and communications security, 2006, pp. 410-420.*

(Continued)

*Primary Examiner* — Robert Leung
(74) *Attorney, Agent, or Firm* — Ryan, Mason & Lewis, LLP (57) ABSTRACT

A first circuit representation of a given function is obtained at a first processing device. The given function comprises at least two computer programming switch statement clauses. A second circuit representation is generated at the first processing device from the first circuit representation wherein the at least two computer programming switch statement clauses are respectively represented by at least two tree circuits that are embedded in the second circuit representation such that the second circuit representation is characterized by a given cost (e.g., a minimum cost). The second circuit representation is encrypted at the first processing device, and sent to a second processing device for secure evaluation of the given function by the second processing device.

22 Claims, 4 Drawing Sheets

(56) References Cited

U.S. PATENT DOCUMENTS

2016/0156595 A1* 6/2016 Wu .................... H04L 63/0428 713/168

OTHER PUBLICATIONS

Schneider, "Practical Secure Function Evaluation," InInformatiktage, Feb. 27, 2008 (pp. 37-40).*
K. Järvinen et al., "Embedded SFE: Offloading Server and Network Using Hardware Tokens (Full Version)," 14th International Conference on Financial Cryptography and Data Security (FC), Jan. 25-28, 2010, 21 pages, Tenerife, Canary Islands.
B. Pinkas et al., "Secure Two-Party Computation Is Practical," 15th International Conference on the Theory and Application of Cryptology and Information Security: Advances in Cryptology (ASIACRYPT), Dec. 6-10, 2009, pp. 250-267, Tokyo, Japan.
Y. Lindell et al., "An Efficient Protocol for Secure Two-Party Computation in the Presence of Malicious Adversaries," 26th Annual International Conference on the Theory and Applications of Cryptographic Techniques: Advances in Cryptology (EUROCRYPT), May 20-24, 2007, pp. 52-78, Barcelona, Spain.
V. Kolesnikov et al., "Advances and Impact of Secure Function Evaluation," Bell Labs Technical Journal, Fall 2009, pp. 187-192, vol. 14, No. 3.
Andrew C. Yao, "Protocols for Secure Computations," IEEE 23rd Annual Symposium on Foundations of Computer Science (SFCS), 1982, pp. 160-164.
Andrew Chi-Chih Yao, "How to Generate and Exchange Secrets (extended abstract)," IEEE 27th Annual Symposium on Foundations of Computer Science, Oct. 1986, pp. 162-167, Toronto, Ontario, Canada.
V. Kolesnikov et al., "A Practical Universal Circuit Construction and Secure Evaluation of Private Functions," 12th International Conference on Financial Cryptography and Data Security (FC), Lecture Notes in Computer Science, Jan. 2008, pp. 83-97, vol. 5143.
Leslie G. Valiant, "Universal Circuits (Preliminary Report)," 8th Annual ACM Symposium on Theory of Computing (STOC), 1976, pp. 196-203.

* cited by examiner

SECURE FUNCTION EVALUATION OF TREE CIRCUITS

FIELD

The application relates generally to cryptography and, more particularly, to techniques for secure function evaluation.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Secure function evaluation (SFE) is a cryptographic technique that allows mutually distrustful parties to evaluate a function on their respective inputs, while maintaining the privacy of the inputs. For instance, two-party SFE allows two parties to evaluate a given function on respective inputs x and y, while maintaining the privacy of both x and y. SFE enables a variety of electronic transactions previously impossible, or at least impractical, due to the mutual mistrust of transaction participants. An electronic transaction is a transaction performed using at least two processing devices electronically connected via at least one communication network. Examples of electronic transactions in which SFE have been applied include, but are not limited to, auctions, contract signing, and database mining.

SFE of private functions is an extension of two-party SFE where the evaluated function is known only by one party and needs to be kept secret (i.e., all attributes of the function other than the function size, the number of inputs, and the number of outputs are hidden from the other party). Examples of private functions include, but are not limited to, an airport no-fly check function, a credit evaluation function, a background checking function, and a medical history checking function. One technique for keeping the function secret is to represent the function as a garbled circuit (GC). The GC-approach for two-party SFE allows one party to compute the function (being represented by the circuit) under encryption.

SUMMARY

Illustrative embodiments provide improved techniques for secure function evaluation.

For example, in one embodiment, a method comprises the following steps. A first circuit representation of a given function is obtained at a first processing device. The given function comprises at least two computer programming switch statement clauses. A second circuit representation is generated at the first processing device from the first circuit representation wherein the at least two computer programming switch statement clauses are respectively represented by at least two tree circuits that are embedded in the second circuit representation such that the second circuit representation is characterized by a given cost (e.g., a minimum cost). The second circuit representation is encrypted at the first processing device, and sent to a second processing device for secure evaluation of the given function by the second processing device.

In another embodiment, an article of manufacture is provided which comprises a processor-readable storage medium having encoded therein executable code of one or more software programs. The one or more software programs when executed by at least one processing device implement steps of the above-described method.

In yet another embodiment, an apparatus comprises a memory and a processor configured to perform steps of the above-described method.

These and other features and advantages of embodiments described herein will become more apparent from the accompanying drawings and the following detailed description.

DETAILED DESCRIPTION

Illustrative embodiments will be described herein with reference to exemplary computing systems, data storage systems, database systems, communication networks, processing platforms, systems, user devices, network nodes, network elements, clients, servers, and associated communication protocols. For example, illustrative embodiments are particularly well-suited for use with and/or in applications that utilize a GC-based approach. However, it should be understood that embodiments are not limited to use with the particular arrangements described, but are instead more generally applicable to any environment in which it is desirable to provide improved SFE techniques.

In GC-based computations, generally, a function to be evaluated is represented as a Boolean circuit comprised of one or more logic gates, wherein input and output terminals of the gates are referred to as wires. Random (garbled) input values are assigned to each wire associated with each gate. A garbled truth table is constructed such that, given the assigned garbled input value of each input wire of the circuit, a corresponding garbled output value is computed for each output wire of the circuit. The circuit, and hence the function, is characterized by such garbled truth tables for each circuit gate.

It is to be appreciated that the term "circuit" as used herein refers to a circuit representation in computer software. Furthermore, the term "cost" as used herein refers to a cost of gates and inputs of a circuit used to represent a function. Such cost can be a computer resource provisioning cost (e.g., amount of computer processing time, amount of computer processing capacity, amount of computer memory allocation, etc.) which can translate into a monetary cost since the higher the computer resource provisioning costs are the higher the monetary costs will be to the party implementing the circuit representation. Thus, as will be explained in further detail herein, it is desirable to reduce the number of gates and inputs in a circuit representation in order to achieve the lowest possible cost or find the minimum cost.

More specifically, in one scenario, assume that the computed function is represented as a Boolean circuit C with a fan-in of two. First, one party, S, encrypts C by encrypting every wire and the truth tables. The encryption is done so as to allow gate evaluation under encryption. The circuit evaluator R, given encryptions of the input wires and the encryption of the truth table, is able to compute the encryption of the output wire. That is, S sends encrypted C and the encryptions of the inputs to R, who evaluates it gate-by-gate and obtains the encryption of the output. Then, S and R "open" the encryptions to obtain the output. It is to be noted that, in the GC-approach, all gates look the same to R, i.e., R is not able to distinguish whether it is evaluating an AND gate, an OR gate, or any other gate.

It is to be appreciated that the phrase "open the encryption" has the following meaning in this embodiment. R has the encryption of the output circuit, so for each wire S only needs to send the mapping between the two possible encryptions and the corresponding plaintext wire values. R looks up its output in this table to obtain the plaintext output. This process is what is meant by open the encryption.

It is realized herein, however, that while SFE provides strong guarantees on the protection of the parties' inputs, this may cause inefficiencies in some cases. Consider the case where the computed function is a switch statement of several clauses, and which depends on S's input. As is known, a switch statement is a computer programming function that evaluates an expression, matching the value of the expression to a case clause (among multiple case clauses in the switch statement), and executes statements associated with that case. A prototypical example using the switch statement is an internal decision which S wants to keep secret; based on this decision, the computed circuit is different. For example, assume that a person's credit may be determined differently based on some personal attribute of the individual. This is an evaluation process which the credit server may want to keep secret. As another example, the Department of Homeland Security (DSH), or Canada's equivalent Transport Security Authority (TSA), executes one of a number of functions (e.g., querying patterns from airlines' databases) based on a current security status. The choice of the function depends on the internal protection information of DHS/TSA and cannot be revealed. These are just some examples of switch statements with multiple clauses.

Currently, the encrypted circuit sent to and evaluated by R includes all of the clauses of the switch statement. This is because non-inclusion of a clause would imply something about S's input, making the protocol insecure. Embodiments propose to utilize the fact that the function of an encrypted gate is invisible to the evaluator R, and propose to efficiently overlay the clauses. For this, it is not necessary for the gates of different clauses to implement different functions. Rather, the wiring of the circuit is what is considered. Given the circuits (directed graphs) for the clauses, a circuit (directed graph) is constructed that is universal for the clauses. That is, every clause has to "fit" into the resulting circuit. An efficient solution to this fitting problem, as will be explained in detail herein in accordance with one or more embodiments, provides an important improvement to the area of SFE, resulting in factors of improvement in computation and communication.

Restated in mathematical terms, embodiments solve the following underlying graph-theoretic problem: Given two directed fan-in two trees $T_1$, $T_2$, find the minimal (in the number of nodes) fan-in two tree T, such that both $T_1$ and $T_2$ are contained (in a weak isomorphic sense) in T. Accordingly, given as input two tree circuits $T_1$ and $T_2$, embodiments use a dynamic programming-based methodology to determine the smallest tree circuit T that embeds both of them. It is to be appreciated that the solution to the two-tree problem generalizes to the n-tree problem, e.g., by applying the methodology consecutively.

Figure 1:
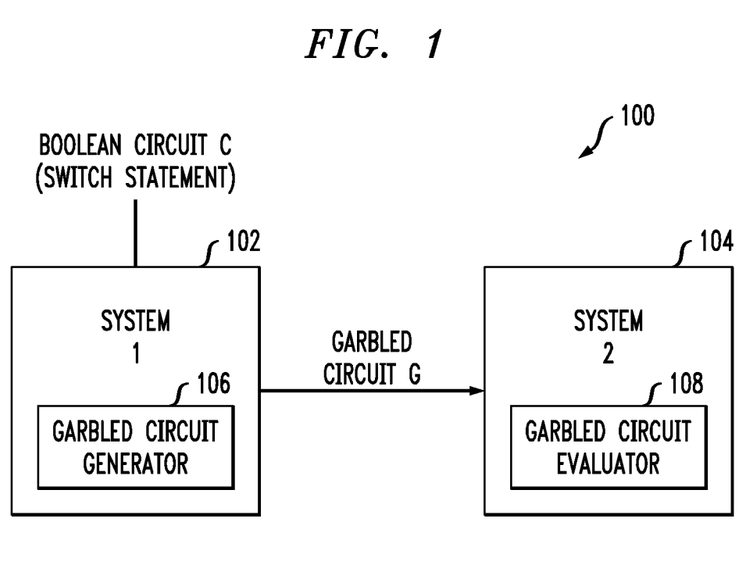
FIG. 1 illustrates a system environment with improved secure function evaluation techniques according to one embodiment.

FIG. 1 illustrates a system environment 100 in which the above-mentioned dynamic programming methodology is employed. More specifically, two mutually distrustful processing devices (e.g., computers, clients, servers, etc.), system 1 (102) and system 2 (104) evaluate an input function on their respective inputs.

In one example, assume the function being privately evaluated is an airport no-fly check function. In such a scenario, system 1 (102) could be a U.S. government server containing a no-fly list, while system 2 (104) could be a foreign government airline server. System 2 wants to determine if passenger X should be allowed to fly to the U.S. The U.S. government does not want to give the foreign government access to no-fly list, while the foreign government does not want the U.S. to know what names they are querying. Thus, the no-fly list check function would be represented by a garbled circuit generated by system 1 and sent to system 2 for secure evaluation.

Another example is a medical history check function. Assume system 1 (102) is a server with complete medical histories of a particular group of people. Assume system 2 (104) is a pharmacy server. System 2 wants to determine if there are possible side effects of drug X. System 1 does not want to give a complete history to the pharmacy, but system 2 needs this information to answer the query. Thus, the medical history check function would be represented by a garbled circuit generated by system 1 and sent to system 2 for secure evaluation.

Figure 2A:
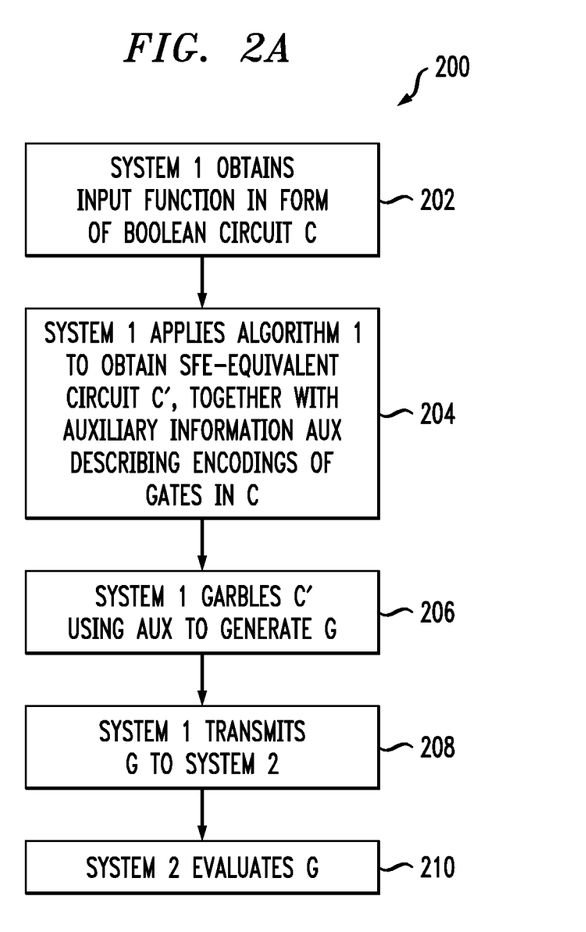
FIG. 2A illustrates a methodology for evaluating a garbled circuit according to one embodiment.

FIG. 2A illustrates an embodiment of the function evaluation methodology 200. As shown in step 202, system 1 obtains the input function in the form of Boolean circuit C. This Boolean circuit represents, for example, a given switch statement with multiple clauses (e.g., no-fly check function, medical history check function, etc.). System 1, in step 204, applies the dynamic programming methodology (denoted as Algorithm 1) to obtain an SFE-equivalent circuit C' and auxiliary information AUX describing the way to lay out each of the possible clauses of C inside C' (i.e., describing encodings of gates in C). Using AUX, in step 206, system 1 garbles the SFE-equivalent circuit C' to generate garbled circuit G. Generation of the garbled circuit is performed via garbled circuit generator 106 (FIG. 1). In step 208, system 1 sends garbled circuit G to system 2. System 2 evaluates garbled circuit G in step 210. Evaluation of the garbled circuit is performed via garbled circuit evaluator 108 (FIG. 1).

C' (which will be represented below as T in Algorithm 1 descriptions) is essentially an unprogrammed circuit, that is, there are gates and wires connecting them, but the gates do not have a type, i.e., AND, OR, etc. Algorithm 1 ensures that tree circuits $T_1$ and $T_2$ (representing respective clauses in the subject function) both 'fit' inside C'=T. Because C' is unprogrammed, in order to be evaluated, the specific programming of each gate needs to be specified. AUX provides this information and can be reconstructed from the way that $T_1$ and $T_2$ both 'fit' inside C'=T. Specifically, as will be described below, an embedding for $T_1$ into T is a mapping (or function) $f_1$ which maps gates of $T_1$ into gates of T. So, for each node of C, AUX describes the specific programming of the node based on how $T_1$ and $T_2$ both 'fit' inside C. System 1 then can garble C' using the programming information contained in AUX.

Figure 2B:
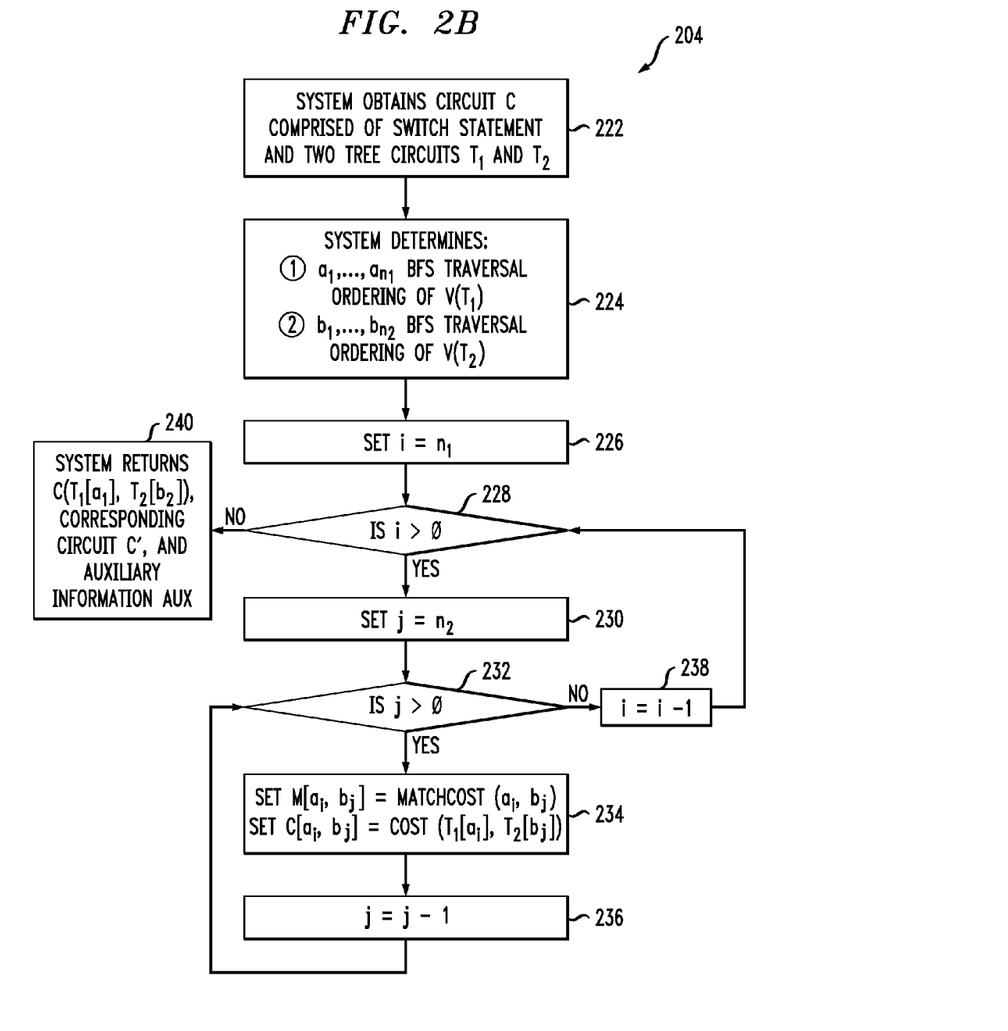
FIG. 2B illustrates a methodology for generating a garbled circuit according to one embodiment.

FIG. 2B illustrates an embodiment of step 204. In step 222, the system (e.g., system 1 in FIG. 1) obtains Boolean circuit C comprised of switch statement clauses and two tree circuits $T_1$ and $T_2$.

It is to be appreciated that $T_1$ and $T_2$ are respective translations of input circuits. More particularly, these tree circuits are circuit directed acyclic graphs (DAGs) which can be built as follows:

Let C be a circuit defined by gates $g_1, \ldots, g_n$ and wires $w_1, \ldots, w_m$. We use the following weighted DAG D=(V,A,w) to represent the circuit. The node set V has three parts: for each wire $w_i$ that is an input to C, we add an "input" node $n_i$, for each output wire $w_i$, we add an "output" node $n_i$, and for each gate $g_i$, we introduce a "gate" node $n_i$. All directed edges in E are directed in the direction of evaluation. Specifically, for each input wire to gate $g_i$ there is an edge from its corresponding "input" node to the "gate" node $n_i$. For each output wire from gate $g_i$ there is an edge from the "gate" node $n_i$ to its corresponding "output" node. For each wire from gate $g_i$ to gate $g_j$, there is an edge from $n_i$ to $n_j$. Finally, for a gate node $g_i$ corresponding to an XOR-gate, we give all in-edges e of $g_i$ weight $w_e=0$, for output nodes $n_i$, we give all in-edges e of $n_i$ weight $w_e=0$, and all other edges e receive weight $w_e=1$. We call such a DAG, the circuit DAG. It is to be appreciated that given a circuit DAG, a circuit corresponding thereto can always be determined In step 224, the system determines breath-first search (BFS) traversal orderings, respectively, for $T_1$ and $T_2$. More particularly, a BFS traversal is computed for $T_1$ as $a_1, \ldots, a_{n1}$, and a BFS traversal is computed for $T_2$ as $b_1, \ldots, b_{n1}$. In step 226, set $i=n_1$. In step 228, it is determined whether or not i>0. If yes, then in step 230, set $j=n_2$. In step 232, it is determined whether or not j>0. If yes, then in step 234, the following values are calculated:

$M[a_i, b_j]$=matchcost $(a_i, b_j)$; and $C[a_i, b_j]$=cost $(T_1[a_i, T_2[b_j])$.

These values will be explained in further detail below in the context of a description of "Algorithm 1." In step 236, j is decremented by one (j=j−1), and the methodology returns to step 232. If j is still greater than zero, then steps 234 and 236 are repeated. However, if j is not greater than zero, then the methodology decrements i by one (i=i−1) in step 238 and returns to step 228. If i is still greater than zero, then steps 230 through 238 are repeated. If i is not greater than zero, then the methodology proceeds to step 240 where the system returns $C(T_1[a_1], T_2[b_2])$, corresponding circuit C', and auxiliary information AUX.

We now provide a further illustrative description of Algorithm 1. We restrict our attention to circuits that have fan-out one and fan-in bounded by k. These are commonly referred to as in-arborescences of bounded in-degree k, but for ease of exposition we call them tree circuits. We describe a polynomial time exact algorithm that given two circuit trees $T_1$ and $T_2$ finds a circuit tree T of minimum cost embedding both $T_1$ and $T_2$. Specifically, we prove the following:

The cost of embedding a set of circuit DAGs $D_1, \ldots, D_t$, denoted cost $(D_1, \ldots, D_t)$, is the cost of a circuit DAG $D_0$ of minimum cost such that there is an embedding of $D_i$ into $D_0$ for all i=1 . . . t. DAG refers to directed acyclic graph.

Let $T_1$ and $T_2$ be tree circuits of fan-out k. There exists an $O(k!|T_1||T_2|)$ algorithm to determine an optimal, i.e., minimum cost, tree circuit T embedding both $T_1$ and $T_2$. In order to prove this statement, we use dynamic programming and match pairs of vertices of $T_1$ and $T_2$ as follows. For simplicity, assume every non-leaf node of $T_1$ and $T_2$ has weighted in-degree of exactly two and we omit dealing with Free-XOR for now. We use $\delta^-(v)$ to denote in in-degree of a node. It is to be understood that the illustrative concepts described here are extended to the general case.

For circuit DAG D and t∈D, let D[t] be the circuit DAG induced on vertices v such that there exists a directed path from v to t in D.

We define the matchcost of a∈$T_1$ and b∈$T_2$ as the minimum cost of a tree T such that there exists a mapping $f_1$ that embeds $T_1[a]$ into T and a mapping $f_2$ that embeds $T_2[b]$ into T where $f_1(a)=f_2(b)$. We denote this minimum cost by matchcost (a, b).

Consider computing cost $(T_1, T_2)$ where a is the root of $T_1$ and b is the root of $T_2$. Clearly, there is no advantage, with respect to cost, to mapping a and b to disjoint subtrees of T and so either: (i) $f_1(a)\in T[f_2(b)]$, or (ii) $f_2(b)\in T[f_1(a)]$. From this it follows that we can compute cost $(T_1, T_2)$ by considering $O(|T_1|+|T_2|)$ matchcosts.

Let $T_1$ and $T_2$ be tree circuits with roots a and b, respectively. We define:

$$\text{cost}_2(T_1,T_2):=\min_{t\in T_2}(\text{cost}(T_2)-\text{cost}(T_2[t])+\text{matchcost}(a,t)). \quad (i)$$

$$\text{cost}_1(T_1,T_2):=\min_{t\in T_1}(\text{cost}(T_1)-\text{cost}(T_1[t])+\text{matchcost}(t,b)). \quad (ii)$$

Let $T_1$ and $T_2$ be tree circuits with roots a and b, respectively. Let T be a minimum cost tree circuit with $f_1$ embedding $T_1$ and $f_2$ embedding $T_2$.

If $f_1(a)\in T[f_2(b)]$, then cost $(T_1,T_2)=\text{cost}_2(T_1,T_2)$, (i)

If $f_2(b)\in T[f_1(a)]$, then cost$(T_1,T_2)=\text{cost}_1(T_1,T_2)$.

This is proven as follows. Without loss of generality, assume that $f_1(a)=t'\in T[f_2(b)]$ and consider the minimum cost and minimum edge tree circuit T. The root r of T is equal to $f_2(b)$ (by minimality) and there exists t∈$T_2$ such that $f_2(t)=t'$. We have that cost $(T_1,T_2)$ is equal to the cost of embedding the tree $T_2-T_2[t]$ plus the minimum cost of a tree T' that embeds both $T_2[t]$ and $T_1$ given that a and t are mapped to the root of T'. Hence:

cost $(T_1,T_2)$=cost$(T_2-T_2[t])$+matchcost$(a, t)$=cost $(T_2)$−cost$(T_2[t])$+matchcost $(a,t)$=cost$_2(T_1,T_2)$.

A corollary to this would be: cost $(T_1, T_2)$=min $\{\cos_1(T_1, T_2), \text{COSt}_2(T_1,T_2)\}$.

In order to achieve a suitable runtime, we observe that we can determine these costs using the children of a and b together with a single matchcost.

Let $T_1$ and $T_2$ be tree circuits with roots a and b, respectively. Then, $$cost_1(T_1, T_2) = \min\{matchcost(a, b),$$
$$\min_{a' \in N_{\overline{T}_1}(a)} (\text{cost}(T_1) - \text{cost}(T_1[a']) + cost_1[T_1[a']][T_2]) \},$$

and $$cost_2(T_1, T_2) = \min$$
$$\{matchcost(a, b), \min_{b' \in N_{\overline{T}_2}(b)} (\text{cost}(T_2) - \text{cost}(T_2[b']) + cost_2[T_1][T_2[b']]) \},$$

This is proven as follows. We have that:

$$\min_{t \in T_1[a']} (\text{cost}(T_1) - \text{cost}(T_1[t]) + \text{matchcost}(t, b)) = \text{cost}(T_1) - \text{cost}(T_1[a']) +$$

$$\min_{t \in T_1[a']} (\text{cost}(T_1[a']) - \text{cost}(T_1[t]) + \text{matchcost}(t, b)) =$$

$$\text{cost}(T_1) - \text{cost}(T_1[a']) + \text{cost}_1[T_1[a']][T_2].$$

Hence:

$$\text{cost}_1(T_1, T_2) =$$

$$\min_{t \in T_1[a']} (\text{cost}(T_1) - \text{cost}(T_1[t]) + \text{matchcost}(t, b)) = \min\{\text{matchcost}(a, t)$$

$$\min_{a' \in N_{\overline{T}_1}(a)} \min_{t \in T_1[a']} (\text{cost}(T_1) - \text{cost}(T_1[t]) + \text{matchcost}(t, b))\} =$$

$$\min\{\text{matchcost}(a, b) \min_{a' \in N_{\overline{T}_1}(a)} (\text{cost}(T_1) - \text{cost}(T_1[a']) +$$

$$\text{cost}[T_1[a']][T_2])\}.$$

In order to determine cost $(T_1, T_2)$, it remains to show how to determine matchcost $(a, b)$. Since the mapping of a and b are fixed, matchcosts are easier to compute. Indeed, we can assume $f_1(a) = f_2(b)$ is the root of T. Moreover, if either $T_1[a]$ or $T_2[b]$ is a singleton then matchcost $(a, b)$ can be determined in a straightforward way.

It is observed that if $T_1[a]$ is a singleton, then for all $b \in T_2$, matchcost $(a, b) = \text{cost}(T_1[a], T_2[b]) = \text{cost}(T_2[b])$. If $T_2[b]$ is a singleton, then for all $a \in T_1$, matchcost $(a, b) = \text{cost}(T_1[a], T_2[b]) = \text{cost}(T_1[a])$.

From the above observation, it is trivial to determine matchcost $(a, b)$ whenever either a is a leaf of $T_1$ or b is a leaf of $T_2$. Specifically, in the case that b is a leaf, we have matchcost $$(a, b) = \sum_{t \in T_1[a]} 2^{\sum_{v \in N_{\overline{T}_1}(t)} w_{vt}}$$

when a is a leaf, then we have matchcost $$(a, b) = \sum_{t \in T_2[a]} 2^{\sum_{v \in N_{\overline{T}_2}(t)} w_{vt}}.$$

We therefore can assume that $T_1[a]$ and $T_2[b]$ each have at least three vertices. To determine matchcost $(a, b)$, we simply consider all possible pairings of the children.

For $a \in T_1$ with in-neighbors $a_0$, $a_1$ and $b \in T_2$ with in-neighbors $b_0$, $b_1$ we have: matchcost $$(a, b) = 2^2 + \min_{i \in \{0,1\}} \min_{j \in \{0,1\}} (\text{cost}(T_1[a_i], T_2[b_j]) + \text{cost}(T_1[a_{1-i}], T_2[b_{1-j}])).$$

This is proven as follows. Since $\delta(a) = \delta^-(b) = 2$, the minimum cost of a tree circuit T embedding both a and b is $2^2$ plus the minimum cost of embedding the subtrees $T_1[a_0]$, $T_1[a_1]$, $T_2[b_0]$, and $T_2[b_1]$. We only need to check which of the four possible feasible combinations achieves the minimum.

Thus, the following is proven. Let $T_1$ and $T_2$ be tree circuits of fan-in two. There exists an $O(|T_1||T_2|)$ algorithm to determine cost $(T_1, T_2)$ and return the corresponding optimal tree circuit T. Consider an illustrative code representation referred to below as Algorithm 1. We note that by proceeding in a reverse BFS-ordering of both V $(T_1)$ and V $(T_2)$ we ensure that we can compute $\text{cost}_1$, $\text{cost}_2$ and matchcost in Lines 7, 8 and 9. Note that V( ) denotes the set of vertices for a given tree circuit. Hence, the correctness of this algorithm follows from the above explanations. As is known, in graph theory, BFS is a strategy for performed an ordered search in a graph when the search is restricted to visiting and inspecting a node (vertex) of a graph, and then gaining access to visit the nodes (vertices) that neighbor the currently visited node. The BFS begins at a root node and inspects all the neighboring nodes. Then, for each of those neighbor nodes in turn, it inspects their neighbor nodes which were unvisited, and so on.

Clearly the run time is equal to $O(|T_1||T_2|)$ times the runtime of determining $M[a_i, b_j]$ and $C[a_i, b_j]$. We consider these two parts separately. First, determining $M[a_i, b_j]$ takes constant time. Hence, the total time taken determining the $|T_1| \times |T_2|$ array is $O(|T_1||T_2|)$. Determining $C_1[a_i, b_j]$ takes $O(\delta^-(a)+1)$ time. Hence, the total time determining $C_1$ is $\Sigma_{a_i} \Sigma_{b_j} O(\delta^-(a_i)+1) = |T_2| \Sigma_{a_i} O(\delta(a_i)+1) = O(|T_2||T_1|)$. Similarly, the total time taken determining $C_2$ is $O(|T_1||T_2|)$. The runtime now follows. Finally, determining an optimal tree is now trivial given the choices made by Algorithm 1 below.

---

Algorithm 1: Determining cost $(T_1, T_2)$

Input: Binary tree circuits $T_1$, $T_2$
Output: cost $(T_1, T_2)$
let $a_1, \ldots a_{n_1}$ be a BFS-ordering of V $(T_1)$
let $b_1, \ldots b_{n_2}$ be a BFS-ordering of V $(T_2)$
for i = $n_1$ down to 1:
... for j = $n_2$ down to 1:
...... determine M $[a_i, b_j]$ = matchcost $(a_i, b_j)$.
...... determine $C_1$ $[a_i, b_j]$ = $\text{cost}_1$ $(T_1 [a_i], T_2 [b_j])$.
...... determine $C_2$ $[a_i, b_j]$ = $\text{cost}_2$ $(T_1 [a_i], T_2 [b_j])$.
...... set C $[a_i, b_j]$ = min $(C_1 [a_i, b_j], C_1 [a_i, b_j])$.
return C $(T_1 [a_1], T_2 [b_1])$

---

Assume $T_1$ and $T_2$ have fan-out bounded by k. We observe that we can assume that every node except the leaves has fan-out exactly k. To do this, for each node with fan-out less than k, we add an edge incident with weight equal to zero. We now define $\delta$ (v) to be the weighted in-degree of a node v equal to the sum of weights on the in-edges. Clearly, the cost of $T_1$ and $T_2$ has not increased. The amount that node $t \in T$ for which $f_1(a) = f_2(b) = t$ contributes to the overall cost $(T_1, T_2)$ is now equal to max $\{2^{\delta^-(a)}, 2^{\delta^-(b)}\}$. Second, we now must consider each of the k! pairings of children of a and b in the minimization. Thirdly, to deal with XOR-gates (exclusive-OR gates), which are free in terms of cost, when two XOR gates are mapped to the same node in T, we ensure zero additional cost is added. With these modifications, it follows that Algorithm 1 can also be used to compute cost $(T_1, T_2)$ in this more general case.

Further, our solution is optimal for a class of computed circuits. For the case that the input circuits are trees, our solution provides a solution that is optimal (that is, its size is minimal). Hence, this provides a computationally efficient approach for SFE.

Figure 3:
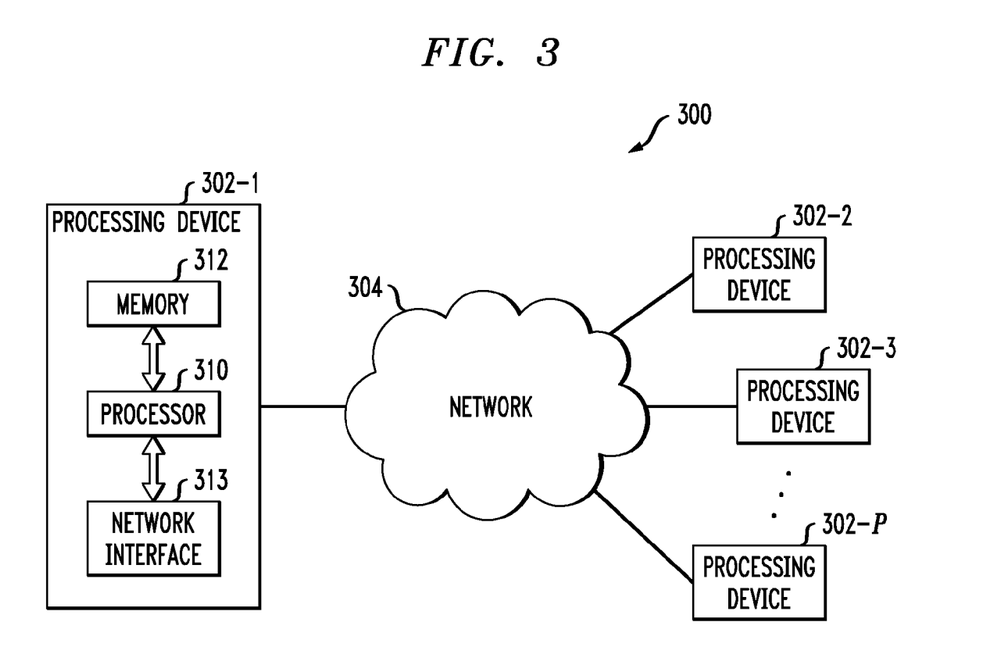
FIG. 3 illustrates a processing platform on which a system with improved secure function evaluation techniques is implemented according to one or more embodiments.

Turning now to FIG. 3, a processing platform is shown on which a system environment with improved secure function evaluation techniques as described herein (e.g., system environment 100 in FIG. 1 implementing methodology 200 in FIGS. 2A and 2B) is implemented according to one or more embodiments. The processing platform 300 in this embodiment comprises a plurality of processing devices denoted 302-1, 302-2, 302-3, ... 302-P, which communicate with one another over a network 304. One or more of the systems, devices, components and/or modules of the system environment 100 (e.g., system 102, system 104, and various other devices, components and/or modules not expressly shown) may therefore each run on one or more computers or other processing platform elements, each of which may be viewed as an example of what is more generally referred to herein as a "processing device." As illustrated in FIG. 3, such a device generally comprises at least one processor and an associated memory, and implements one or more functional modules for instantiating and/or controlling features of systems and methodologies described herein. Multiple elements or modules may be implemented by a single processing device in a given embodiment.

The processing device 302-1 in the processing platform 300 comprises a processor 310 coupled to a memory 312. The processor 310 may comprise a microprocessor, a microcontroller, an application-specific integrated circuit (ASIC), a field programmable gate array (FPGA) or other type of processing circuitry, as well as portions or combinations of such circuitry elements. Components of a system as disclosed herein can be implemented at least in part in the form of one or more software programs stored in memory and executed by a processor of a processing device such as processor 310. Memory 312 (or other storage device) having such program code embodied therein is an example of what is more generally referred to herein as a processor-readable storage medium. Articles of manufacture comprising such processor-readable storage media are considered embodiments. A given such article of manufacture may comprise, for example, a storage device such as a storage disk, a storage array or an integrated circuit containing memory. The term "article of manufacture" as used herein should be understood to exclude transitory, propagating signals.

Furthermore, memory 312 may comprise electronic memory such as random access memory (RAM), read-only memory (ROM) or other types of memory, in any combination. The one or more software programs when executed by a processing device such as the processing device 302-1 causes the device to perform functions associated with one or more of the components/steps of system 100 and methodology 200. One skilled in the art would be readily able to implement such software given the teachings provided herein. Other examples of processor-readable storage media embodying embodiments may include, for example, optical or magnetic disks.

Also included in the processing device 302-1 is network interface circuitry 314, which is used to interface the processing device with the network 304 and other system components. Such circuitry may comprise conventional transceivers of a type well known in the art.

The other processing devices 302 of the processing platform 300 are assumed to be configured in a manner similar to that shown for processing device 302-1 in the figure.

The processing platform 300 shown in FIG. 3 may comprise additional known components such as batch processing systems, parallel processing systems, physical machines, virtual machines, virtual switches, storage volumes, logical units, etc. Again, the particular processing platform shown in FIG. 3 is presented by way of example only, and private database system 100 of FIG. 1 may include additional or alternative processing platforms, as well as numerous distinct processing platforms in any combination.

Also, numerous other arrangements of clients, servers, computers, storage devices or other components are possible. Such components can communicate with other elements of the system over any type of network (e.g., network 130 in FIG. 1 and/or network 304 in FIG. 3), such as a wide area network (WAN), a local area network (LAN), a satellite network, a telephone or cable network, a storage network, a converged network or various portions or combinations of these and other types of networks.

Although certain illustrative embodiments are described herein in the context of systems and networks utilizing particular communication protocols, other types of systems and networks can be used in other embodiments. As noted above, the terms "system" and "network" as used herein are therefore intended to be broadly construed. Further, it should be emphasized that the embodiments described above are for purposes of illustration only, and should not be interpreted as limiting in any way. Other embodiments may use different types of network, device and module configurations, and alternative communication protocols, process steps and operations for implementing improved SFE functionality. The particular manner in which network nodes communicate can be varied in other embodiments. Also, it should be understood that the particular assumptions made in the context of describing the illustrative embodiments should not be construed as requirements of the inventions. The inventions can be implemented in other embodiments in which these particular assumptions do not apply. These and numerous other alternative embodiments within the scope of the appended claims will be readily apparent to those skilled in the art.

What is claimed is:

1. A method, comprising:
   obtaining, at a first processing device, a first circuit representation of a given function, wherein the given function comprises at least two computer programming switch statement clauses;
   generating, at the first processing device, a second circuit representation from the first circuit representation wherein the at least two computer programming switch statement clauses are respectively represented by at least two tree circuits that are embedded in the second circuit representation by overlaying the at least two computer programming switch statement clauses such that the second circuit representation is characterized by a given computer resource provisioning cost;
   encrypting, at the first processing device, the second circuit representation; and
   sending, from the first processing device, the encrypted second circuit representation to a second processing device for secure evaluation of the given function by the second processing device.

2. The method of claim 1, wherein the second circuit representation generating step further comprises computing an optimal tree circuit that is characterized by the minimum computer resource provisioning cost in which the at least two tree circuits respectively representing the at least two computer programming switch statement clauses are embedded.

3. The method of claim 2, wherein the optimal tree circuit is computed by determining a first breadth-first search ordering of nodes for a first one of the at least two tree circuits and a second breadth-first search ordering of nodes for a second one of the at least two tree circuits.

4. The method of claim 3, wherein the optimal tree circuit is computed by determining a matching cost metric defined as a minimum computer resource provisioning cost of a given tree circuit such that there exists a first mapping that embeds the ordered nodes of the first one of the at least two tree circuits into the given tree circuit and a second mapping that embeds the ordered nodes of the second one of the at least two tree circuits into the given tree circuit, where the first mapping equals the second mapping.

5. The method of claim 4, wherein the optimal tree circuit is computed by determining a first cost metric for the first one of the at least two tree circuits and a second cost metric for the second one of the at least two tree circuits, wherein the first cost metric and the second cost metric are computed based on the matching cost metric.

6. The method of claim 5, wherein the optimal tree circuit is computed by minimizing the first cost metric and the second cost metric.

7. The method of claim 2, wherein the computed optimal tree circuit is the second circuit representation which is encrypted and sent to the second processing device for secure evaluation of the given function.

8. An apparatus, comprising:
a memory; and
a processor operatively coupled to the memory to form a first processing device configured to:
obtain a first circuit representation of a given function, wherein the given function comprises at least two computer programming switch statement clauses;
generate a second circuit representation from the first circuit representation wherein the at least two computer programming switch statement clauses are respectively represented by at least two tree circuits that are embedded in the second circuit representation by overlaying the at least two computer programming switch statement clauses such that the second circuit representation is characterized by a given computer resource provisioning cost;
encrypt the second circuit representation; and
send the encrypted second circuit representation to a second processing device for secure evaluation of the given function by the second processing device.

9. The apparatus of claim 8, wherein generation of the second circuit representation further comprises computing an optimal tree circuit that is characterized by the minimum computer resource provisioning cost in which the at least two tree circuits respectively representing the at least two computer programming switch statement clauses are embedded.

10. The apparatus of claim 9, wherein the optimal tree circuit is computed by determining a first breadth-first search ordering of nodes for a first one of the at least two tree circuits and a second breadth-first search ordering of nodes for a second one of the at least two tree circuits.

11. The apparatus of claim 10, wherein the optimal tree circuit is computed by determining a matching cost metric defined as a minimum computer resource provisioning cost of a given tree circuit such that there exists a first mapping that embeds the ordered nodes of the first one of the at least two tree circuits into the given tree circuit and a second mapping that embeds the ordered nodes of the second one of the at least two tree circuits into the given tree circuit, where the first mapping equals the second mapping.

12. The apparatus of claim 11, wherein the optimal tree circuit is computed by determining a first cost metric for the first one of the at least two tree circuits and a second cost metric for the second one of the at least two tree circuits, wherein the first cost metric and the second cost metric are computed based on the matching cost metric.

13. The apparatus of claim 12, wherein the optimal tree circuit is computed by minimizing the first cost metric and the second cost metric.

14. The apparatus of claim 9, wherein the computed optimal tree circuit is the second circuit representation which is encrypted and sent to the second processing device for secure evaluation of the given function.

15. An article of manufacture comprising a non-transitory processor-readable storage medium having embodied therein executable program code that when executed by the processing device causes the processing device to perform steps of:
obtaining, at a first processing device, a first circuit representation of a given function, wherein the given function comprises at least two computer programming switch statement clauses;
generating, at the first processing device, a second circuit representation from the first circuit representation wherein the at least two computer programming switch statement clauses are respectively represented by at least two tree circuits that are embedded in the second circuit representation by overlaying the at least two computer programming switch statement clauses such that the second circuit representation is characterized by a given computer resource provisioning cost;
encrypting, at the first processing device, the second circuit representation; and
sending, from the first processing device, the encrypted second circuit representation to a second processing device for secure evaluation of the given function by the second processing device.

16. The article of claim 15, wherein the second circuit representation generating step further comprises computing an optimal tree circuit that is characterized by the minimum computer resource provisioning cost in which the at least two tree circuits respectively representing the at least two computer programming switch statement clauses are embedded.

17. The article of claim 16, wherein the optimal tree circuit is computed by determining a first breadth-first search ordering of nodes for a first one of the at least two tree circuits and a second breadth-first search ordering of nodes for a second one of the at least two tree circuits.

18. The article of claim 17, wherein the optimal tree circuit is computed by determining a matching cost metric defined as a minimum computer resource provisioning cost of a given tree circuit such that there exists a first mapping that embeds the ordered nodes of the first one of the at least two tree circuits into the given tree circuit and a second mapping that embeds the ordered nodes of the second one of the at least two tree circuits into the given tree circuit, where the first mapping equals the second mapping.

19. The article of claim 18, wherein the optimal tree circuit is computed by determining a first cost metric for the first one of the at least two tree circuits and a second cost metric for the second one of the at least two tree circuits, wherein the first cost metric and the second cost metric are computed based on the matching cost metric.

20. The article of claim 19, wherein the optimal tree circuit is computed by minimizing the first cost metric and the second cost metric.

21. The article of claim 16, wherein the computed optimal tree circuit is the second circuit representation which is encrypted and sent to the second processing device for secure evaluation of the given function.

22. The method of claim 1, wherein overlaying the at least two computer programming switch statement clauses comprises combining the at least two tree circuits into another tree circuit having a reduced number of nodes relative to a number of nodes collectively utilized in the at least two tree circuits such that the given computer resource provisioning cost of the second circuit representation is reduced relative to a circuit representation not overlaying the at least two tree circuits.

* * * * *